United States Patent [19]

St. Hilaire

[11] Patent Number: 4,957,513
[45] Date of Patent: Sep. 18, 1990

[54] METHOD OF PURIFYING A MIXED $H_2/H_2SE$ VAPOR STREAM

[75] Inventor: Kelly L. St. Hilaire, Hollis, N.H.

[73] Assignee: Raytheon Company, Lexington, Mass.

[21] Appl. No.: 349,661

[22] Filed: May 10, 1989

[51] Int. Cl.[5] .................... B01D 53/22; B01D 71/68
[52] U.S. Cl. ........................................... 55/16; 55/68; 55/72
[58] Field of Search ............... 55/16, 68, 72, 158; 423/248, 508, 509, 644, 645

[56] References Cited

U.S. PATENT DOCUMENTS

| | | | |
|---|---|---|---|
| 3,966,889 | 6/1976 | Kakuta et al. | 55/72 X |
| 4,229,188 | 10/1980 | Intille | 55/16 |
| 4,264,338 | 4/1981 | Null | 55/16 |
| 4,398,926 | 8/1983 | Doshi | 55/16 |
| 4,654,047 | 3/1987 | Hopkins et al. | 423/248 X |
| 4,790,945 | 12/1988 | Baker | 55/72 X |
| 4,792,405 | 12/1988 | Baker | 55/72 X |

FOREIGN PATENT DOCUMENTS

| | | | |
|---|---|---|---|
| 1186245 | 4/1985 | Canada | 55/16 |
| 0075431 | 3/1983 | European Pat. Off. | 55/16 |
| 55-119420 | 9/1980 | Japan | 55/16 |
| 61-209030 | 9/1986 | Japan | 55/72 |

OTHER PUBLICATIONS

"Ultrafiltration and Microfiltration Hollow Fiber Membrane Cartridges", A.G. Technology, (Effective 1/1/86).

Spillman et al., "Economics of Gas Separation Membranes", Chemical Engineering Progress, Jan. 1989, pp. 41-62.

"Innovative Hollow Fiber Membrane Technology", A/G Technology Corporation, 3/86.

Gollan et al., "Membrane-Based Air Separation", AIChE Symposium Series, No. 250, vol. 82, (1986), pp. 35-47.

Primary Examiner—Robert Spitzer
Attorney, Agent, or Firm—Denis G. Maloney; Richard M. Sharkansky

[57] ABSTRACT

Mixed hydrogen selenide gas stream is separated by passing the gas stream through a filter to separate the hydrogen selenide from the gas stream.

14 Claims, 4 Drawing Sheets

METHOD OF PURIFYING A MIXED $H_2/H_2SE$ VAPOR STREAM

BACKGROUND OF THE INVENTION

This invention relates generally to purification of a gas stream and more particularly to the purification of a mixed gas stream of hydrogen and hydrogen selenide.

As is known in the art, hydrogen selenide is an important intermediate component in the production of zinc selenide which is used as an optical material at infrared wavelengths.

It is also well known in the art that hydrogen selenide is an extremely toxic gas. Current techniques for using hydrogen selenide in the production of zinc selenide optical material involve directing gas vapors from a bulk source of $H_2Se$ into a chemical vapor deposition reactor to effect a chemical reaction to form zinc selenide. It would be desirable to reduce exposure to such a toxic substance by manufacturing hydrogen selenide in a continuous process and on an "as needed" basis, so that in the event of an accident, the system can be immediately shutdown in a controlled manner permitting little or no hydrogen selenide gas to escape into an external environment. This scenario would be contrasted to an industrial accident where, for example, a valve was sheared off of a tank storing $H_2Se$ allowing for an uncontrolled escape of the gas.

Several processes for the production of hydrogen selenide are known in the art. Commercially, $H_2Se$ is typically formed by the reaction of an acid and metal selenide, for example, $HCl+FeSe$. This gas generation process produces impurities such as $H_2O$ and $HCl$ in the desired gas product stream which must be removed to produce a suitably pure gas source for chemical vapor deposition of ZnSe. Moreover, this process is also a batch-type process.

Another such technique is described in Great Britain Patent Application No. 1508749 and includes the step of bubbling hydrogen gas through a molten source of selenium to produce hydrogen selenide. This reaction is a low yield reaction. After the hydrogen selenide is formed and leaves the reactor vessel, the vapor stream includes a substantial amount of unreacted hydrogen. However, a gas vapor stream, typically of at least 90% pure hydrogen selenide is required to provide a suitable reactant during chemical vapor deposition of zinc selenide.

To increase the purity of $H_2Se$, generally the hydrogen selenide+hydrogen vapor stream is passed through a batch-type cryogenic process to separate the hydrogen selenide from the hydrogen. The process includes introducing the mixed vapor stream from the reactor vessel into a first vessel cooled to a temperature at which the hydrogen selenide freezes out of the mixture, while allowing the gaseous hydrogen to escape from the first vessel until a quantity of the solid hydride is accumulated in the first vessel. The first vessel is then disconnected from the reactor vessel and connected to a second vessel also cooled to a temperature at which the hydrate freezes. The first vessel is allowed to rise to a temperature at which the hydride therein develops a gaseous phase so that it is transferred to the second vessel. The hydrate is then re-solidified in the second vessel as hydrogen is again allowed to escape from the second vessel.

There are also several problems with this latter approach. A first problem is that the process is non-continuous (i.e. a batch-type process). Inherent in this process is a requirement for storage for long periods of time of a large quantity of hydrogen selenide in either a gaseous, liquid, or solid form. Since hydrogen selenide has an extremely high vapor pressure, the presence of stored hydrogen selenide during this cryogenic separation process presents potential safety problems in the event of an accident. A second problem with such process is the complexity and expense involved with the technique. These factors limit the availability of hydrogen selenide production to only gas suppliers or large users of the product. Small end user such as ZnSe optical material manufacturers must depend upon tanks of such gases from suppliers. This, however, increases the possibility of an industrial accident.

SUMMARY OF THE INVENTION

In accordance with a present invention, a method of separating a mixed flow including hydrogen selenide and undesired vapor or gas components includes the steps of introducing said mixed flow at a pressure $P_f$ into a feed inlet of a gas membrane separator, said membrane comprised of closely packed, hollow, polysulfone fibers which are preferentially permeable to hydrogen selenide, said gas membrane separator further having a retentate outlet which provides from the feed flow a flow enriched in undesired components. The separator further includes a permeate outlet which is fed a flow enriched in hydrogen selenide at a pressure $P_p$. A pressure differential of at least 15–20 psi is provided between the feed side of the separator and the permeate side of the separator to create a pressure drop across the membrane. In addition, a compression ratio of $P_f/P_p$ of at least 5.0 is also provided. With such an arrangement, the desired separation is provided without significantly affecting the physical properties of the hydride.

In a preferred embodiment of the invention, the retentate outlet of the separator is enriched in hydrogen and is recycled back to the hydrogen selenide gas generator to make use of the hydrogen enriched gas stream by the $H_2Se$ generator. With such an arrangement, a continuous process is provided for the separation of hydrogen selenide gas from a mixed vapor stream of hydrogen selenide and hydrogen. Such a process eliminates the need for storage for substantial periods of time of large quantities of hydrogen selenide in either vapor, liquid, or solid form. Therefore, with this particular process, relatively safe use of hydrogen selenide such as in making zinc selenide optical material is provided without the need to store large quantities of toxic $H_2Se$.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
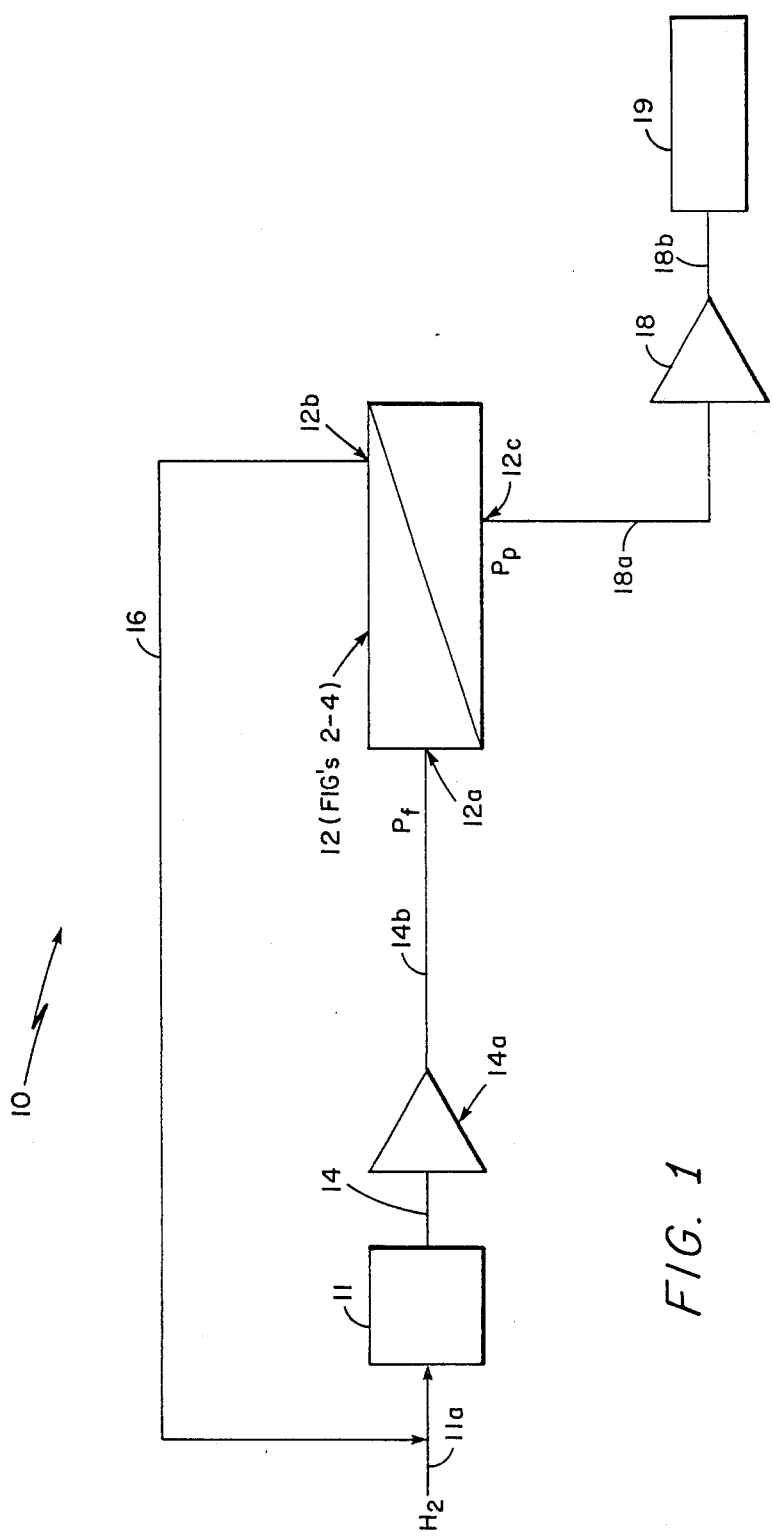
FIG. 1 is a schematic diagram showing an apparatus for effecting a gas separation of a mixed hydrogen selenide/hydrogen vapor stream.

Referring now to FIG. 1, apparatus 10 for providing a process for continuously separating hydrogen selenide from a mixed vapor stream of here 50% hydrogen selenide and 50% hydrogen ($H_2Se+H_2$) is shown to include a hydrogen selenide gas generator 11 fed via a line 11a of stainless steel from a hydrogen source $H_2$ coupled to an inlet tube 14 here comprised of stainless steel, which feeds an inlet port of a compressor 14a with an outlet of said compressor 14a feeding a stainless steel tube 14b. Tube 14b is connected to the inlet 12a of a cartridge gas separator 12 as will be described in conjunction with FIGS. 2-4. The cartridge separator 12 in addition to having the above-mentioned inlet port 12a has a pair of outlet ports 12b and 12c. The first outlet port 12b is the so-called retentate port which is fed gas that passes along the membrane and which does not substantially permeate the membrane. The retentate port 12b is coupled back to the $H_2Se$ generator 11 via a line 16 also comprised of stainless steel. Line 16 is used to feed a hydrogen enriched gas stream from the retentate port 12b back to the gas generator to reuse the hydrogen in making more $H_2Se$. The second outlet port 12c referred to as the permeate port collects the gas that permeates through the membrane as will be described in conjunction with FIG. 2. The permeate port 12c is coupled via tube 18a also here comprised of stainless steel to an outlet compressor 18. The outlet of compressor 18 is fed via tube 18b to a utilization device 19. Compressors 14a and 18 are used to provide a pressure difference in the range of 15 psig to 30 psig between ports 12a and 12c and thus create a pressure differential across the membrane of cartridge 12 and in addition provide a compression ratio $P_f/P_p$ of 5 or greater. Preferably, an inlet pressure of 5 psig is provided by compressor 14a and a vacuum of 22-24 inches of Hg is provided by compressor 18a. In certain embodiments of the invention, either one of the compressors 14a or 18 may be eliminated and the other one of the compressors may be used to provide the entire pressure differential provided that the maximum inlet pressure specified for the membrane is not exceeded.

Figure 3:
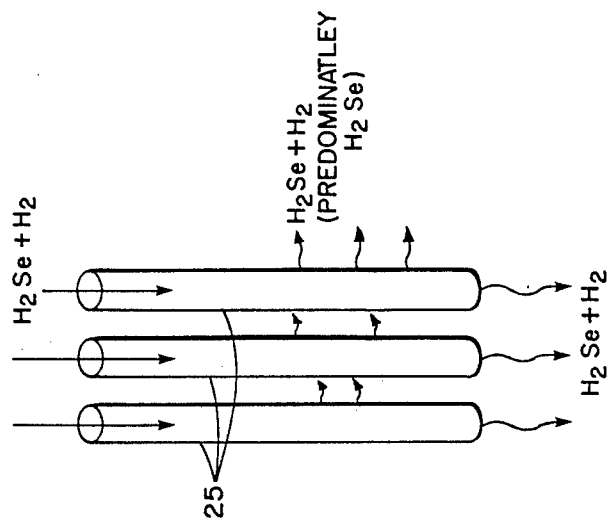
FIG. 3 is an exploded view taken along line 3—3 of FIG. 2.
Figure 2:
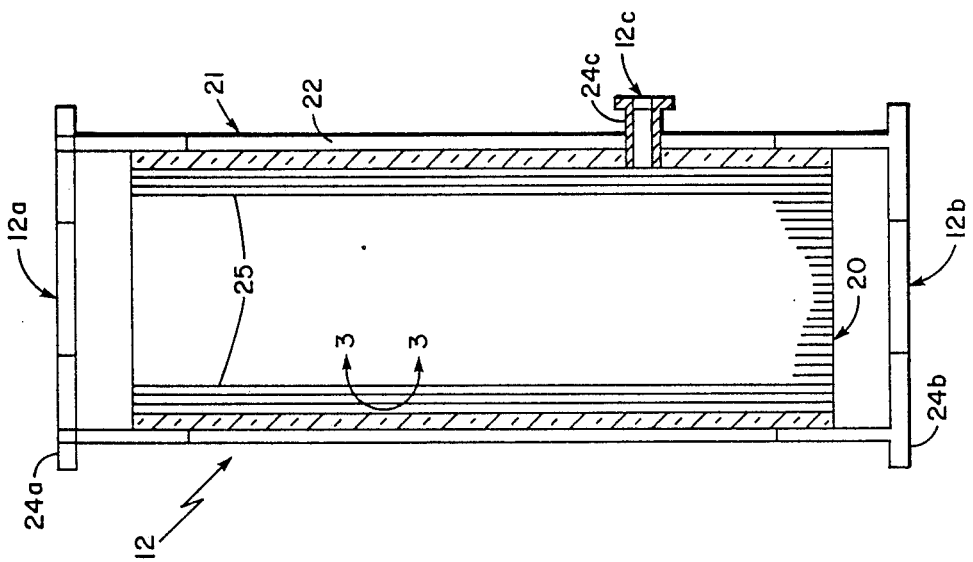
FIG. 2 is a cross-sectional view of the gas separator used in the apparatus of FIG. 1.
Figure 4:
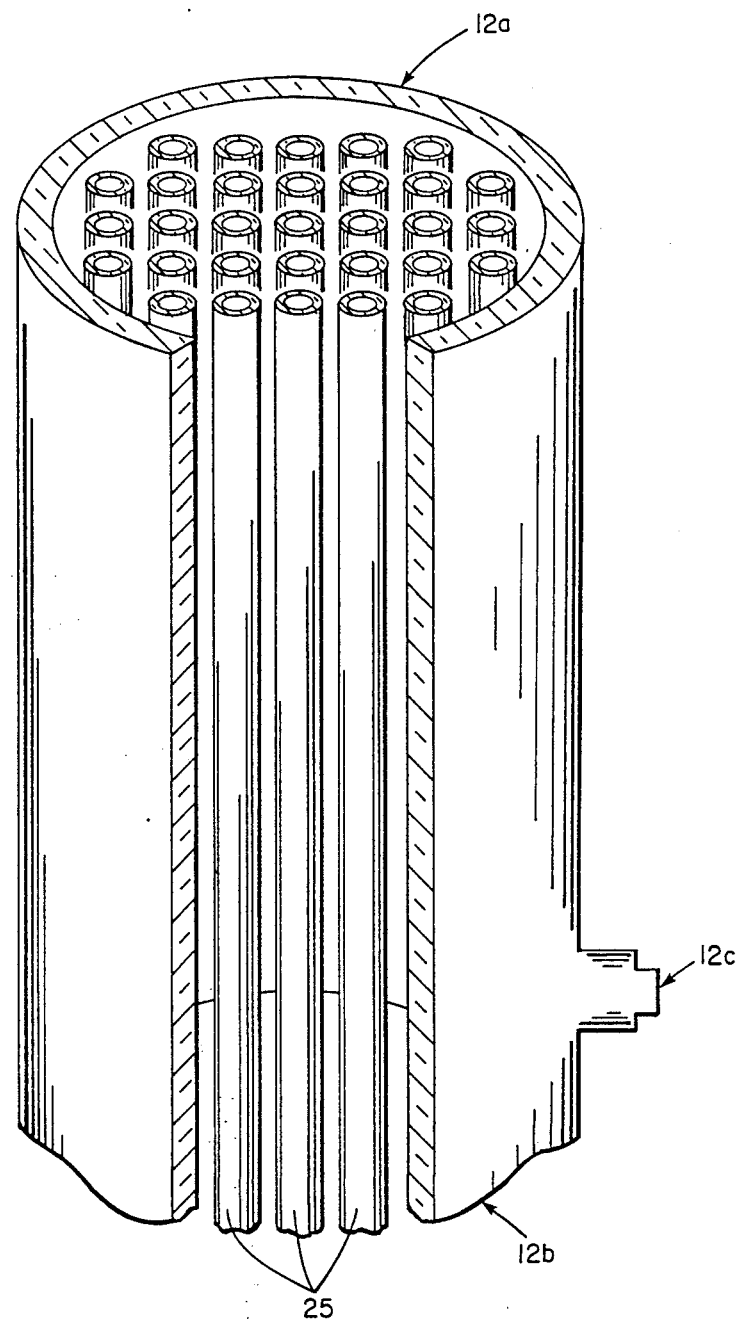
FIG. 4 is a pictorial representation of the gas separator shown in FIG. 2.

Referring now to FIGS. 2-4, a cartridge 20 here suitably for use as the cartridge separator 12 apparatus as described in conjunction with FIG. 1 is shown to include a pressure vessel 21 of stainless steel having disposed therein the cartridge 20 here comprised of polysulfone, said cartridge 20 being a hollow cylinder 22. Disposed in the hollow cylindrical portion of said cartridge 20 are multitude or plurality of hollow fibers 25 here also comprised of a polysulfone material. The cartridge 20 is arranged with fittings 24a, 24b on end portions of the pressure vessel 21 and a fitting 24c at one of the wall portions of the vessel 21. As shown in particular with respect to FIGS. 3 and 4, gas is introduced through fitting 24a and the gas is directed through hollow fibers 25. As the mixed vapor stream of $H_2Se+H_2$ is fed into the fibers 25, due to the pressure differential between port 12b and 12a and due to the preferential permeability of the polysulfone fibers 25 to $H_2Se$ and not to $H_2$, $H_2Se$ molecules permeate through the walls of the fibers 25 and are collected in the spaces between said fibers 25. $H_2Se$ molecules are pulled towards port 12b by the pressure differential across the membrane (i.e. walls of the polysulfone fibers 25). Exiting, therefore, from port 12c is a vapor flow which is enriched in $H_2Se$ and depleted in $H_2$. Conversely, as the gas stream is fed through the fibers 25 and at the end portions of the fibers adjacent to port 12b, a second gas stream is collected which is enriched in $H_2$ and depleted in $H_2Se$.

A preferred commercially available cartridge is available from A.G. Technology Corp, Needham, Mass., Part No. 11A301205AL having a separation factor S=3.3 for separation of hydrogen selenide+hydrogen. The cartridge includes a membrane comprised of polysulfone hollow fibers in which the hydrogen selenide is drawn through the walls of the fibers i.e. the membrane walls and exits to the side port. To effect the desired separation, a compression ratio $P_f/P_p$ greater than or equal to 5.0 is provided. Moreover, a pressure drop across the walls of the polysulfone fibers must be induced. The magnitude of the pressure drop generally corresponds to the desired product flow rate in a total membrane area according to the equation:

$$P = m \cdot (1/C) \cdot (1/A)$$

where m=desired produced flow rate expressed in liters per minute, A=total membrane area (ft$^2$), and C is a constant characteristic of the membrane type expressed in liters/minute-feet Ft$^2$-psi.

Other types of polymer membranes, as well as, other polysulfone base polymeric membranes may be used in place of the cartridge shown in FIG. 1. Selection of such an alternate membrane would initially involve a determination of the separation factor S. The separation factor is the ratio of individual volumetric flow rates of hydrogen selenide and hydrogen through the membrane walls at a specific pressure. To determine the separation factor S of a membrane, pure hydrogen is first introduced into the filter at an inlet pressure $P_1$. The flow rate of the hydrogen through the membrane, walls and thus at the permeate port 12c is measured using a rotameter or mass flow controller. The cartridge is then purged with nitrogen to remove residual hydrogen. After the purging, pure hydrogen selenide is also introduced at the same inlet pressure into the cartridge at terminal 12a in the same manner as for the hydrogen. The flow rate of the hydrogen selenide through the membrane wall is also measured using the rotameter connected to port 12c. The separation factor is thus determined by comparing the two measured flow rates. The procedure is repeated for various inlet pressures from 0-10 psi, and the recorded separation factor is the average of those determined at different pressures. The higher S the better the separation and thus the better the purification of the $H_2Se+H_2$ gas stream.

In polymeric membranes, gas separation occurs due to the different levels of solubility and diffusion through the membrane layer. Solubility is a thermodynamic property and diffusion is a kinetic quantity. The permeability of a given gas is an intrinsic property of the membrane and is generally related to Henry's Law for simple non-interacting gases and for low concentration levels is generally given by:

$$P_{ri} = S_i \cdot D_i$$

where $P_{ri}$ is the intrinsic permeability of the gas in the membrane, $S_i$ is the solubility of the gas in the membrane, and $D_i$ is the diffusivity of the gas in the membrane. The mass transport of the gas through the membrane is given by Fick's law as:

$$N_i = \frac{P_{ri}}{\delta} \cdot (A) \cdot (\Delta P)$$

where $N_i$ is the flow rate of the gas, A is the membrane area, $\delta$ is the membrane separation barrier thickness, and $\Delta P$ is the partial pressure across the membrane. For a given membrane system, therefore, the degree of separation between the gases depends upon the relative permeabilities of the gas to be separated. This ratio of gas permeabilities is denoted as the separation factor and is arrived at experimentally as described above. Thus, the higher the separation factor, the better the gas separation process and the more economically feasible the gas separation process will be. A more detailed discussion of the theory of gas separation using polymeric membranes is described in an article entitled "Membrane Based Air Separation" by Golan et al., AICHE Symposium Series No. 250, Vol. 82 (1986), pp. 35-47.

Figure 5:
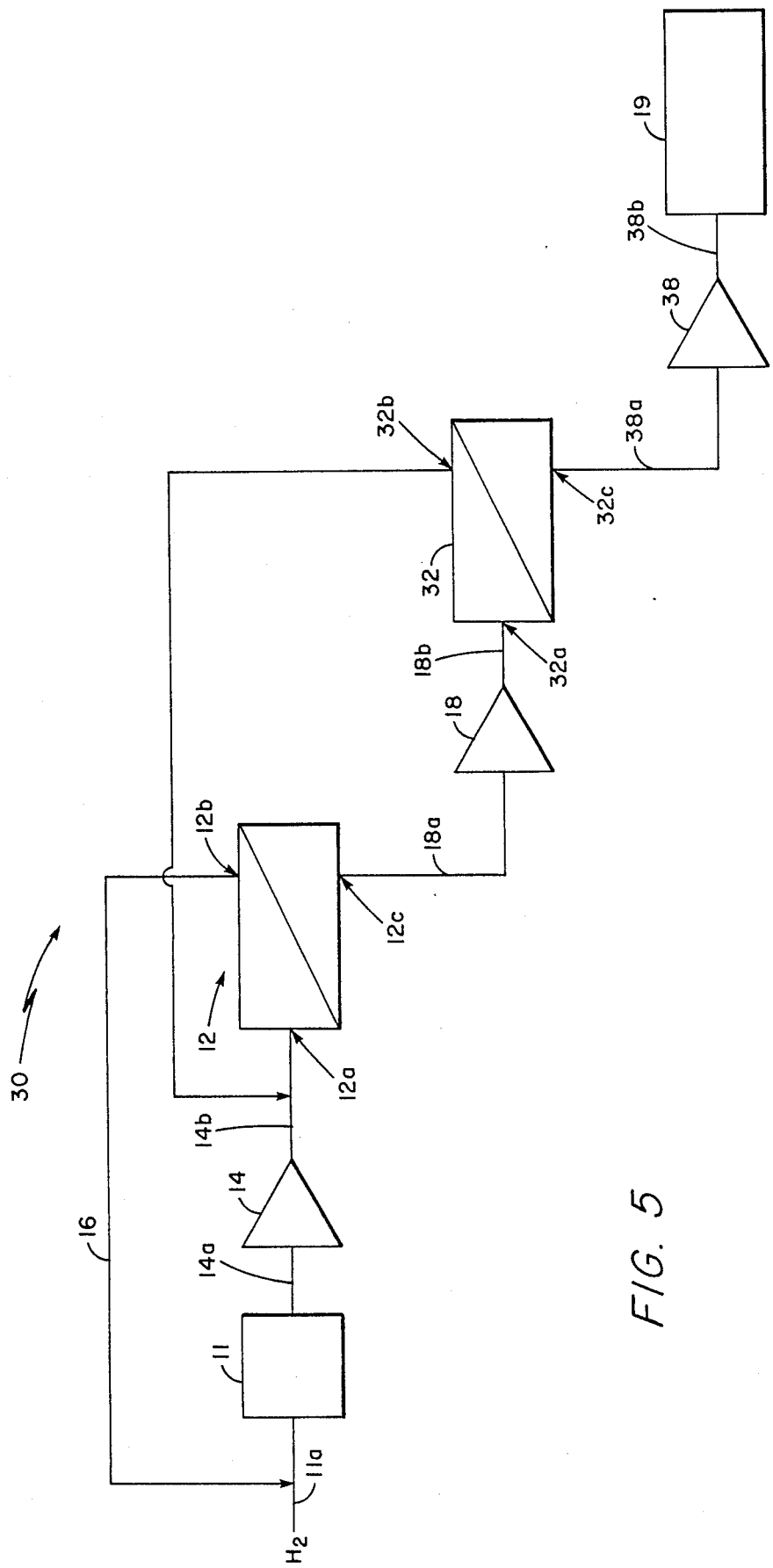
FIG. 5 is a schematic diagram showing an alternate embodiment of an apparatus for effecting a gas separation of a mixed hydrogen selenide, hydrogen vapor stream.

Referring now to FIG. 5, a two stage separation process 30 is shown to include the lines, compressors, and gas separator 10 of FIG. 1 and a second stage comprised of a second cartridge separator 32 here similar as cartridge separator 12 of FIG. 1, having an inlet port 32a fed from compressor 18 via line 18b as described for FIG. 1 and a retentate port 32b which feeds a second enriched hydrogen gas stream here back to the inlet 12a of the first cartridge separator 12. The second cartridge 32 will have a smaller surface area than cartridge separator 12 due to the lower inlet flow rate from the permeate port of the first cartridge 12. Permeate port 32c is connected to a third compressor 38 via line 38a which pulls a vacuum at the permeate port 32c as generally described for FIG. 1. A pressure drop across the membrane of 15-30 psi and a compression ratio of at least 5.0 is here also provided for optimal performance. The outlet of the third compressor 38 is fed to the utilization device 19 via stainless steel line 38b, as shown. With a single stage separator a 50/50 inlet mixture is separated to approximately 80% to 85% H2Se balance H2. A two stage approach produces a gas stream approximately 90% to 95% H2Se balance H2.

Having described preferred embodiments of the invention, it will now become apparent to one of skill in the art that other embodiments incorporating their concepts may be used. For example, vapor streams of H2Se and other components may be separated using the teachings of the present invention. It is felt, therefore, that these embodiments should not be limited to disclosed embodiments, but rather should be limited only by the spirit and scope of the appended claims.

I claim:

1. A method of separating a mixed flow including hydrogen selenide, comprises the steps of:
   introducing said mixed flow of hydrogen selenide into a compressor to provide a pressurized mixed flow having a first pressure;
   feeding said pressurized mixed flow into a gas separator having a polymer membrane and a feed inlet to receive the pressurized mixed flow, a retentate outlet to provide a residual flow depleted in hydrogen selenide, and a permeate outlet to provide a flow enriched in hydrogen selenide; and
   providing a pressure drop across the membrane and a compression ratio of inlet pressure ($P_f$) to permeate pressure ($P_p$), to extract a flow enriched in hydrogen selenide from the permeate outlet of the gas separator.

2. The method of claim 1 wherein said compression ratio is at least 5.0.

3. The method of claim 2 wherein the step of providing the pressure drop across the membrane includes the step of providing a pressure differential between the feed inlet of the separator and the permeate outlet of the separator in the range of 15 psig to 30 psig.

4. The method of claim 1 wherein said pressure drop across the membrane and compression ratio is provided in part by the step of drawing a vacuum at the permeate outlet of the gas separator.

5. The method of claim 4 further comprising the steps of:
   providing a gas generator to feed the mixed flow including hydrogen selenide; and
   feeding the retentate flow from the retentate outlet of the gas membrane separator to an inlet of the gas generator.

6. The method of claim 1 wherein said gas membrane separator is comprised of a plurality of hollow, polysulfone fibers disposed in a container, said fibers being selected to be preferentially permeable to H2Se.

7. A method of separating a mixed flow of hydrogen selenide and hydrogen from a gas generator, comprises the steps of:
   introducing said mixed flow of hydrogen selenide and hydrogen into an inlet of a gas separator having a polymer membrane, said membrane comprised of closely packed hollow polysulfone fibers which are preferentially permeable to hydrogen selenide, said gas membrane separator further having a retentate outlet from which is fed, in response to said mixed flow, a flow enriched in hydrogen and depleted in hydrogen selenide, and a permeate outlet from which is fed, in response to said mixed flow, a flow enriched in hydrogen selenide and depleted in hydrogen;
   providing a pressure differential of at least 15 psi between the pressure ($P_f$) at the feed inlet of the separator and the pressure ($P_p$) at the permeate outlet of the separator to effect a pressure drop across the polysulfone fiber walls and a compression ratio of $P_f/P_p$ of at least 5.0 to draw the flow enriched in hydrogen selenide and depleted in hydrogen from the permeate outlet; and
   feeding the flow enriched in hydrogen and depleted in hydrogen selenide from the retentate outlet back into the gas generator.

8. The method of claim 7 wherein the gas separator is a first gas separator, further comprising the steps of:
   introducing said flow enriched in hydrogen selenide into an inlet of a second gas separator having a polymer membrane, said membrane comprised of closely packed hollow polysulfone fibers which are preferentially permeable to hydrogen selenide, said second gas separator further having a retentate outlet from which is fed in response to said flow enriched in hydrogen selenide, a second flow further enriched in hydrogen and depleted in hydrogen selenide, and a permeate outlet from which is fed in response to said flow enriched in hydrogen selenide, a second flow further enriched in hydrogen selenide and depleted in hydrogen;
   providing a pressure differential of at least 15 psi between the pressure ($P_{f1}$) at the feed inlet of the second gas separator and the pressure ($P_{p1}$) at the permeate outlet of the second gas separator to effect a pressure drop across the polysulfone fiber walls, and a compression ratio of $P_{f1}/P_{p1}$ of at least 5.0 to draw a flow enriched in hydrogen selenide from the permeate outlet; and feeding the gas flow from the retentate outlet back to the inlet of the first gas separator.

9. A method of separating a mixed flow including hydrogen and hydrogen selenide, comprises the steps of:

pressurizing said mixed flow to a first pressure;

feeding said mixed flow into a gas separator having a polymer membrane and a feed inlet to receive the mixed flow, a retentate outlet to provide a retentate flow enriched in a first one of hydrogen and hydrogen selenide, and a permeate outlet to provide a permeate flow enriched in a second, different one of hydrogen and hydrogen selenide; and providing a pressure drop across the polymer membrane and a compression ratio of inlet pressure ($P_f$) to permeate pressure ($P_p$), to extract the permeate flow enriched in the selected second one of hydrogen and hydrogen selenide and to provide a retentate flow enriched in the selected first one of hydrogen and hydrogen selenide.

10. The method of claim 9 wherein said pressure drop across the membrane and compression ratio is provided in part by the step of drawing a vacuum at the permeate outlet of the gas separator.

11. The method of claim 10 further comprising the steps of:

providing a gas generator to provide said mixed flow; and feeding the one of the permeate and retentate flows enriched in hydrogen to an inlet of the gas generator.

12. The method of claim 11 wherein said gas membrane separator is comprised of a plurality of hollow, polysulfone fibers disposed in a container, said fibers being selected to be preferentially permeable to $H_2Se$.

13. The method of claim 12 wherein said compression ratio is at least 5.0.

14. The method of claim 12 wherein the step of providing the pressure drop across the membrane includes the step of providing a pressure differential between the pressure at the feed inlet of the separator and the pressure at the permeate outlet of the separator in the range of 15 psig to 30 psig.

* * * * *